(12) United States Patent
Toyoda

(10) Patent No.: US 8,180,116 B2
(45) Date of Patent: May 15, 2012

(54) IMAGE PICKUP APPARATUS AND SYSTEM FOR SPECIFYING AN INDIVIDUAL

(75) Inventor: Tetsuya Toyoda, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 1090 days.

(21) Appl. No.: 11/810,877

(22) Filed: Jun. 5, 2007

(65) Prior Publication Data

US 2008/0002865 A1   Jan. 3, 2008

(30) Foreign Application Priority Data

Jun. 19, 2006  (JP) ................................. 2006-168805

(51) Int. Cl.
*G06K 9/00*  (2006.01)
*G06K 9/46*  (2006.01)

(52) U.S. Cl. ......................... 382/118; 382/103; 382/190

(58) Field of Classification Search .................. 382/118, 382/103, 190; 348/652
See application file for complete search history.

(56) References Cited

U.S. PATENT DOCUMENTS

| | | | |
|---|---|---|---|
| 6,714,665 B1 * | 3/2004 | Hanna et al. ................... | 382/117 |
| 6,944,318 B1 * | 9/2005 | Takata et al. ................... | 382/115 |
| 7,420,601 B2 | 9/2008 | Hong | |
| 2004/0117638 A1 * | 6/2004 | Monroe ........................ | 713/186 |
| 2004/0119851 A1 * | 6/2004 | Kaku ............................. | 348/239 |
| 2004/0183951 A1 * | 9/2004 | Lee ............................... | 348/652 |
| 2004/0207743 A1 * | 10/2004 | Nozaki et al. ............ | 348/333.12 |
| 2004/0208114 A1 * | 10/2004 | Lao et al. ...................... | 369/125 |
| 2005/0063566 A1 * | 3/2005 | Beek et al. .................... | 382/115 |
| 2005/0276481 A1 * | 12/2005 | Enomoto ....................... | 382/190 |
| 2006/0008145 A1 * | 1/2006 | Kaku ............................. | 382/173 |

FOREIGN PATENT DOCUMENTS

| | | |
|---|---|---|
| CN | 1517952 | 8/2004 |
| JP | 2004-192378 | 7/2004 |
| JP | 2006-050101 | 2/2006 |
| JP | 2006-099718 | 4/2006 |

OTHER PUBLICATIONS

Chinese Office Action for Chinese Patent Application No. 2007101046498, mailed on Feb. 12, 2010 (5 pgs.) (with English Translation (3 pgs.)).
Notification of Reasons for Refusal for Japanese Patent Application No. 2006-168805, mailed Mar. 17, 2011 (2 pgs.) with translation (4 pgs.).

* cited by examiner

*Primary Examiner* — Wenpeng Chen
(74) *Attorney, Agent, or Firm* — John C. Pokotylo; Straub & Pokotylo

(57) ABSTRACT

Disclosed is an electronic imaging apparatus which has different drive modes of an image pickup device for image shooting between an image for detecting the face of a subject and an image for detecting a feature value for specifying an individual based on the detected face area. For example, the image for detecting the face of the subject can be shot in a drive mode for a low-resolution image and an image for detecting a feature value can be shot in a drive mode for a high-resolution image. For example, the drive mode for a low-resolution image can be a drive mode for live view display, while the drive mode for a high-resolution image can be a drive mode for shooting a still image.

14 Claims, 4 Drawing Sheets

# IMAGE PICKUP APPARATUS AND SYSTEM FOR SPECIFYING AN INDIVIDUAL

CROSS REFERENCES TO RELATED APPLICATION

This application is based upon and claims the benefit of priority from prior Japanese Patent Application No. 2006-168805, filed on Jun. 19, 2006, the entire contents of which are incorporated herein by reference.

BACKGROUND OF THE INVENTION

1. Field of the Invention

The present invention relates to an electronic imaging apparatus and a system for specifying, or identifying, individual using the electronic imaging apparatus.

2. Description of the Related Art

There have been proposed electronic imaging apparatuses, such as digital cameras, which extract a predetermined frame from the moving image data acquired in a continuous image shooting and detect an area where the face of a person or the like (face area) locates in the extracted frame. Those electronic imaging apparatuses perform AF (Auto Focusing) and AE (Auto Exposure) on the detected face area.

A technique of specifying an individual (individual verification) using a face-area detecting technique is proposed in, for example, Japanese Patent Laid-Open No. 2004-192378. In the publication, first, a face area is detected to specify an individual from image data input from a plurality of imaging parts. Then, the feature value of a face part, such as an eye or the nose in the detected face area, is detected, and the detected feature value of the face is collated with information registered in a predetermined database to specify the individual.

Conventionally, the detection of a face area and the detection of the feature value of the detected face area are executed based on the same image data. For executing face area detection and feature value detection in moving image data, for example, a predetermined frame of the moving image data is extracted and then both the face area detection and feature value detection are executed.

BRIEF SUMMARY OF THE INVENTION

An electronic imaging apparatus of the present invention has different drive modes of an image pickup device between (1) for shooting an image for detecting the face of a subject and, (2) for shooting an image for detecting a feature value based on the detected face area for specifying an individual.

For example, the image for detecting the face of the subject can be shot in a drive mode for a low-resolution image and an image for detecting a feature value can be shot in a drive mode for a high-resolution image. For example, the drive mode for a low-resolution image can be a drive mode for live view display, while the drive mode for a high-resolution image can be a drive mode for shooting a still image.

As an exemplary structure of the present invention, an electronic imaging apparatus comprising an image pickup device having a plurality of drive modes including at least a first drive mode and a second drive mode; a face-area detection part that detects a face area where a face is present in image data acquired by image shooting in the first drive mode; a feature value detection area determining part that determines a feature value detection area for detecting a feature value for specifying an individual from image data acquired by image shooting in the second drive mode, based on the detected face area; and a feature value detection part that detects the feature value from image data within the determined feature value detection area.

The present invention can be understood as an invention of an individual specifying system and an invention of an individual specifying method which use the electronic imaging apparatus.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
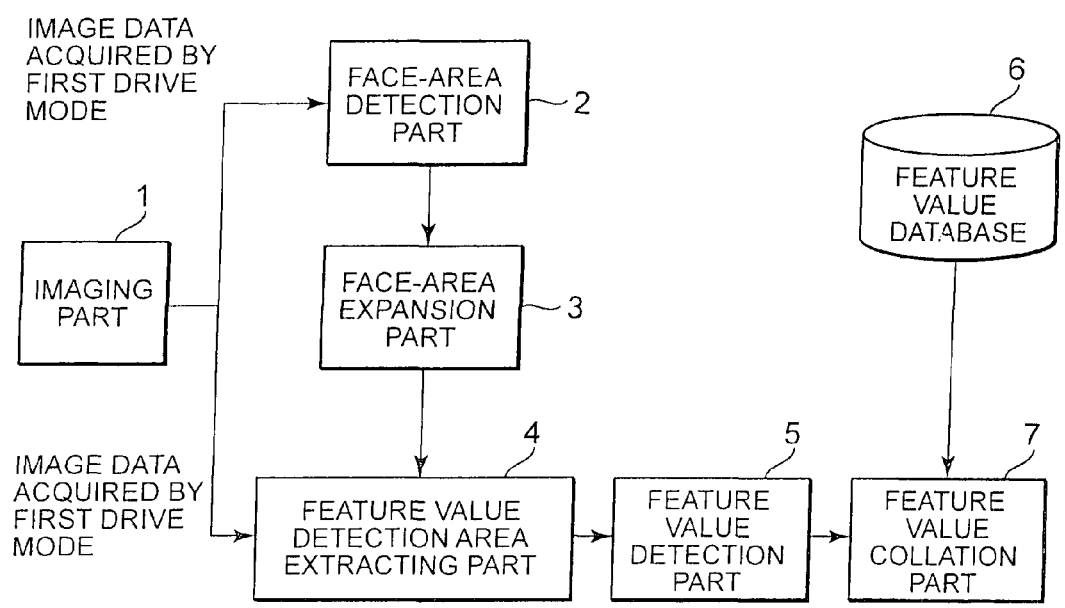
FIG. 1 is a block diagram showing the main configuration of an individual specifying system according to an embodiment of the invention.

FIG. 1 is a block diagram showing the main configuration of an individual specifying system according to an embodiment of the invention. The individual specifying system as shown in FIG. 1 has an imaging part 1, a face-area detection part 2, a face-area expansion part 3, a feature value detection area extracting part 4, a feature value detection part 5, a feature value database 6, and a feature value collation part 7. The individual specifying system as shown in FIG. 1 is provided in an electronic imaging apparatus like a digital camera.

The imaging part 1 acquires image data by performing image shooting in one of at least two drive modes: a first drive mode and a second drive mode. The first drive mode is a drive mode for capturing image data with a low data amount. The second drive mode is a drive mode for capturing image data with a high resolution.

The imaging part 1 first performs image shooting in first drive mode to acquire image data, and sends the image data to the face-area detection part 2. Then, the imaging part 1 performs image shooting in second drive mode with a predetermined time lag to acquire image data and sends the image data to the feature value detection area extracting part 4.

The face-area detection part 2 detects an area equivalent to the face of a subject (face area) from the image data acquired by image shooting in first drive mode performed by the imaging part 1. The face of a subject is not limited to the face of a person, but may be the face of a dog, a cat or the like.

The face-area expansion part 3 expands the face area detected by the face-area detection part 2 according to a predetermined condition. The predetermined condition is determined based on the time difference between the timing at which the image data used in detecting the face in the face-area detection part 2 and the timing at which image data is captured in second drive mode. The feature value detection area extracting part 4 extracts an area corresponding to the face area expanded by the face-area expansion part 3, as a feature value detection area, from the image data acquired by image shooting in second drive mode performed by the imaging part 1. The face-area expansion part 3 and the feature value detection area extracting part 4 constitute a feature value detection area determining part.

The feature value detection part 5 detects the feature value of a face, such as how deep eyes are set, the height of a nose, and the positional relationship between the eyes and the nose, from the image data in the feature value detection area extracted by the feature value detection area extracting part 4. The feature value database 6 stores data on the feature value for specifying an individual. The feature value collation part 7 collates the feature value detected by the feature value detection part 5 with feature values stored in the feature value database 6 to specify an individual.

Figure 2:
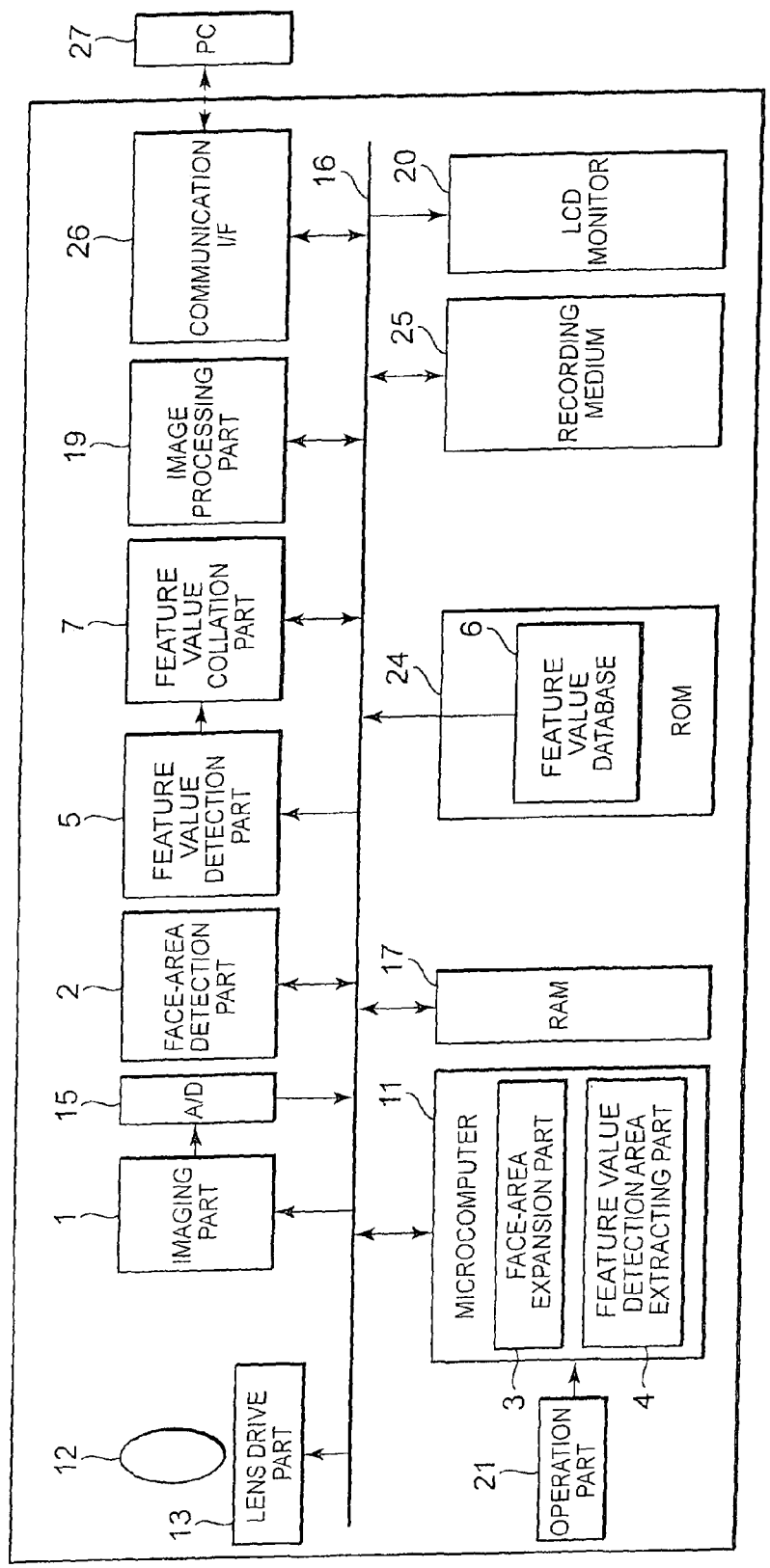
FIG. 2 is a block diagram showing the configuration of an electronic imaging apparatus having the individual specifying system shown in FIG. 1.

The individual specifying system shown in FIG. 1 will be described more specifically. FIG. 2 is a block diagram showing the configuration of an electronic imaging apparatus (e.g., digital camera) having the individual specifying system shown in FIG. 1. The electronic imaging apparatus shown in FIG. 2 includes a microcomputer 11, a photographing lens 12, a lens drive part 13, the imaging part 1, an A/D conversion part 15, a data bus 16, a RAM 17, the face-area detection part 2, an image processing part 19, a liquid crystal display (LCD) monitor 20, an operation part 21, the feature value detection part 5, the feature value collation part 7, a ROM 24, a recording medium 25, and a communication interface (I/F) 26.

The microcomputer 11 performs the general operation control of the electronic imaging apparatus shown in FIG. 2. The microcomputer 11 also serves as a luminance measuring part to measure the luminance of a subject prior to shooting a still image. Further, the microcomputer 11 has the functions of the face-area expansion part 3 and the feature value detection area extracting part 4.

The photographing lens 12 forms the image of the subject (not shown) on the image pickup device of the imaging part 1. The lens drive part 13 drives the photographing lens 12 to adjust the focus of the photographing lens 12 and change the magnification. The imaging part 1 comprises, for example, a CCD type image pickup device, and outputs the image of the subject formed via the photographing lens 12, as an image signal according to the amount of light. The imaging part 1 can operate in at least two drive modes: a drive mode for live view display as the first drive mode and a drive mode for shooting a still image as the second drive mode.

In the drive mode for live view display as the first drive mode, live view (through-image) display is performed to display an image acquired by continuous shooting on the LCD monitor 20 in real time. In this mode, charges acquired by individual pixels of the image pickup device are mixed (added) by a predetermined number of pixels of the same color, and the pixel mixture is read as an image signal. In such a pixel mixing mode, charges of a plurality of pixels are mixed, so that the number of apparent pixels decreases, lowering the resolution of the image while the output of each image signal can be increased. It is therefore possible to acquire an image signal with high S/N which can be output fast.

In the drive mode for shooting a still image as the second drive mode, by way of contrast, a high-resolution still image is shot. In this mode, charges acquired by individual pixels of the image pickup device are read as an image signal without being mixed. In this case, while the amount of data is large, a high-resolution image can be acquired.

The A/D conversion part 15 converts the image signal acquired by the imaging part 1 to a digital signal (image data). The data bus 16 is a transfer path for transferring various kinds of data, such as image data acquired by the A/D conversion part 15. The RAM 17 temporarily stores various kinds of data, such as image data. The face-area detection part 2 reads image data acquired in the drive mode for live view display and stored in the RAM 17, and detects the area of the face (face area) of a subject in the read image data. The image processing part 19 performs image processing, such as white balance correction and gradation conversion, on image data. The LCD monitor 20 displays an image processed by the image processing part 19.

The operation part 21 serves as operation members, such as a release button for instructing the initiation of shooting a still image and the power button of the electronic imaging apparatus. When the user operates the operation part 21, the microcomputer 11 performs a predetermined process according to the operation.

The feature value detection part 5 reads image data acquired in the drive mode for shooting a still image and stored in the RAM 17, and detects a feature value in the read image data. The feature value collation part 7 collates the feature value detected by the feature value detection part 5 with feature values in the feature value database 6 stored in the ROM 24 to specify an individual. Various kinds of programs which are executed by the microcomputer 11 are also stored in the ROM 24.

The recording medium 25 records image data acquired in the drive mode for shooting a still image and processed by the image processing part 19, together with the result of specifying an individual acquired by the feature value collation part 7. The communication I/F 26 is the communication interface for data communication with a personal computer (PC) 27 present outside the electronic imaging apparatus or another external device. The data communication can be carried out by a cable or wirelessly.

Figure 3:
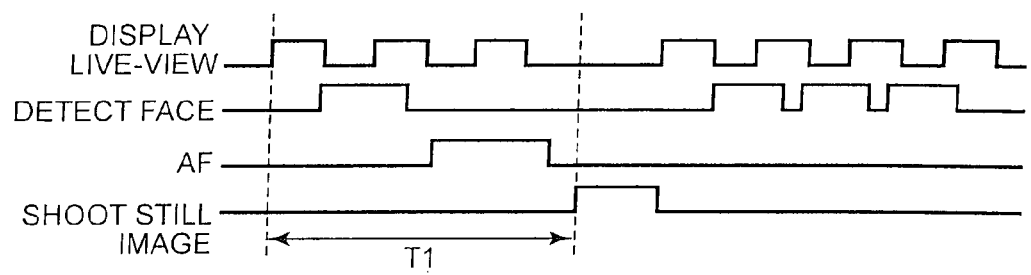
FIG. 3 is a timing chart of live view display, face detection, AF and still image shooting after a user presses a release button.

The operation of the electronic imaging apparatus of the embodiment will be described referring to FIG. 3. FIG. 3 is a timing chart of live-view display, face detection, AF and still image shooting after a user presses the release button.

Before the user presses the release button, such as immediately after the electronic imaging apparatus is powered on, a live view image is displayed on the LCD monitor 20. At this time, the imaging part 1 is driven in the drive mode for live view display. As a result, an image signal with high S/N but low resolution is read out at a given frame rate (e.g., 30 fps (frame per second)). The image signal read by the imaging part 1 is digitized by the A/D conversion part 15 and is stored in the RAM 17 via the data bus 16.

Figure 4:
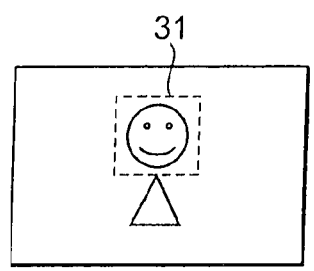
FIG. 4 is a diagram showing a face area.

The face-area detection part 2 detects the position of a face area 31 in the live view image data acquired as shown in FIG. 4. For detection of the face area of a person, for example, the face area 31 can be detected by detecting an area including the approximately circular skin color area in the live view image data by pattern matching or the like. The result of detecting the face area 31 from the face-area detection part 2 (positional information of the face area 31 or information indicating that there is no face area 31 if such is a case) is sent to the microcomputer 11. The detection of the face area 31 can be carried out frame by frame of the live view image data or can be carried out once in several frames.

The image processing part 19 performs various kinds of image processing, such as white balance correction and gradation conversion, for live view display on live view image data stored in the RAM 17. The image data after image process is temporarily stored in the RAM 17, and is then displayed on the LCD monitor 20. At the time of effecting live view display, the face area 31 detected by the face-area detection part 2 can be displayed on the LCD monitor 20 in a superimpose display manner.

When the user presses the release button of the operation part 21, AF and AE are performed on the face area that has been detected upon occurrence of the event. AF is the scheme of, for example, repeatedly shooting an image with the imaging part 1 while driving the photographing lens 12, and setting the position of the photographing lens 12, which is acquired as the result of the repetitive image shooting and provides the highest contrast of the image in the face area 31, as a focus position. AE is the scheme of determining an exposure condition in such a way that the amount of exposure (luminance) in the face area acquired by the imaging part 1 becomes an adequate amount of exposure. The exposure condition includes the release time of the shutter (not shown) and the amount of aperture (not shown).

After the AF, a still image is shot (exposed). In case of a two-level release button, a still image is shot when the user fully presses the release button. At the time of shooting a still image, the imaging part 1 is driven in the drive mode for still image shooting after capturing live view image data is interrupted. Therefore, an image signal with a high resolution is read out. The image signal read by the imaging part 1 is digitized by the A/D conversion part 15 and stored in the RAM 17 via the data bus 16.

Figure 5:
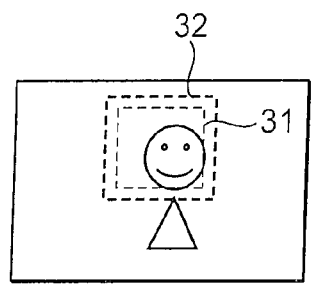
FIG. 5 is a diagram illustrating expansion of a face area.

The microcomputer 11 allows the face-area expansion part 3 to expand the face area detected when the release button is pressed. The expansion is executed because the timing of detecting a face area differs from the timing of shooting a still image in the embodiment. That is, because of both timings different from each other, the subject moves between the detection of the face area and the shooting of a still image, so that at the time of shooting a still image, the subject may not be present in the face area 31. In consideration of this point, the microcomputer 11 expands the face area according to a time difference T1 between the timing of detecting the face area (actually, the timing of capturing live view image data used in detecting the face area) and the timing of shooting a still image. The expansion is carried out by shifting the position of the face area 31 sent to the microcomputer 11 from the face-area detection part 2 (e.g., the position of the vertex of, for example, a rectangular area as shown in FIG. 4). Execution of such a process allows the face area to be expanded to the face area 31 to a face area 32 in FIG. 5.

Figure 6:
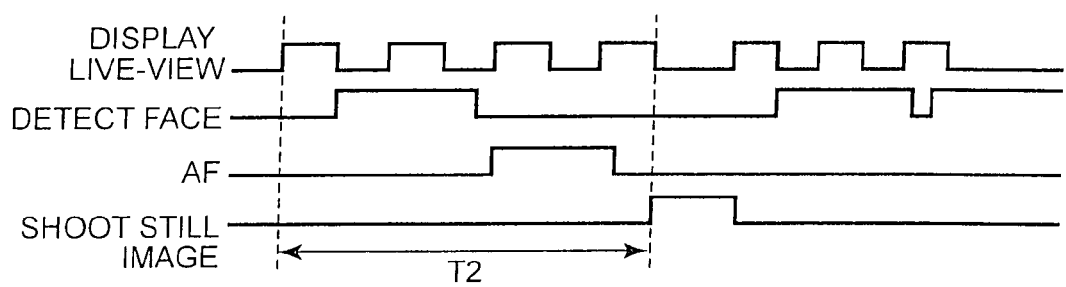
FIG. 6 is a timing chart of live view display, face detection, AF and still image shooting when a subject is dark.
Figure 7:
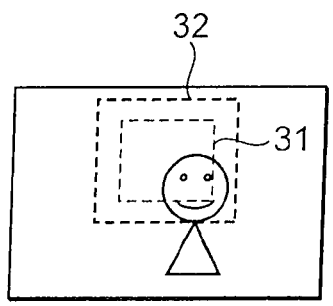
FIG. 7 is a diagram illustrating expansion of a face area when a subject is dark.

FIG. 6 is a timing chart of live view display, face detection, AF and still image shooting when a subject is dark. When a subject is dark, as shown in FIG. 6, the time needed to detect a face area becomes longer than the one in FIG. 3. Therefore, a time difference T2 between the timing of capturing live view image data and the timing of shooting a still image becomes longer than T1 in FIG. 3. As shown in FIG. 7, therefore, the degree of expansion of the face area becomes greater than the one shown in FIG. 5.

After expansion of the face area, the microcomputer 11 extracts an area corresponding to the face area 32 from the still image data, and sends the positional information of the extracted area as the positional information of a feature value detection area.

The feature value detection part 5 detects the feature value of a face, such as how deep eyes are set, the height of a nose, and the positional relationship between the eyes and the nose from the image data in the feature value detection area extracted by the microcomputer 11. The detection process is executed by, for example, pattern matching. The result of detecting the feature value by the feature value detection part 5 is sent to the feature value collation part 7. The feature value collation part 7 collates the feature value detected by the feature value detection part 5 with feature values stored in the feature value database 6 to specify an individual. The result of specifying the individual is sent to the microcomputer 11.

At the time of specifying an individual, the image processing part 19 performs various kinds of image processing, such as white balance correction and gradation conversion, for recording a still image, on the still image data stored in the RAM 17. The image data after image process is stored in the RAM 17.

After the image processing for specifying an individual and the image processing for recording a still image, the microcomputer 11 adds individual specifying information to the image-processed still image data stored in the RAM 17, then records the resultant data in the recording medium 25. Thereafter, the live view display and detection of a face area are resumed.

According to the embodiment, as described above, the detection of a face area which can be executed at a low resolution but relatively takes time is executed by using small-amount image data acquired in the drive mode for live view display or the first drive mode. On the other hand, the detection of a feature value can be executed faster than the detection of a face area, but high-resolution image data is needed to acquire a high accuracy, therefore the detection of a feature value is executed by using high-resolution image data acquired in the drive mode for a still image or the second drive mode. This can ensure a fast processing speed and a high accuracy in specifying an individual at the same time.

There may be a case where the timing of detecting a face area differs from the timing of shooting a still image so that a subject may move in the time difference. In the embodiment, a face area is expanded to take the time lag into account. Even if the subject moves, therefore, a feature value detection area can be extracted properly. While expansion of a face area increases the amount of processing in detecting a feature value, the amount of processing is sufficiently smaller than the amount of processing needed to detect a face area in still image data.

Although the foregoing description of the invention has been given of the embodiment, the invention is not limited to the embodiment, but can of course be modified and adapted in various forms within the scope of the invention. For example, when a subject is dark as shown in FIG. 6, detection of a face area takes time. This increases the degree of expansion of a face area as shown in FIG. 7. In consideration of this point, the degree of expansion can be determined according to the luminance of the subject which is detected at the time of AE using the microcomputer 11 serving as the luminance measuring part without detecting the time difference between the timing of capturing live view image data and the timing of shooting a still image, which is used in detecting the face area.

While the function of the face-area expansion part 3 and the function of the feature value detection area extracting part 4 are achieved by the microcomputer 11 in the electronic imaging apparatus as shown in FIG. 2 in consideration of the amount of processing and the space or the like needed at the time of mounting those parts, the functions can be realized by a separate IC or the like. The functions of the face-area detection part 2, the feature value detection part 5 and the feature value collation part 7 can be realized by the microcomputer 11.

Further, while the feature value database is stored in the ROM 24 of the electronic imaging apparatus (digital camera) in FIG. 2, the feature value database may be constructed in the PC 27.

In the above-described embodiment, charges acquired by individual pixels of the image pickup device are mixed by a predetermined number of pixels of the same color before being output as an image signal in the drive mode for live view display as the first drive mode. However, the invention is not limited to this embodiment, and a thinned readout mode in which charges from individual pixels of the image pickup device in the image pickup device can be used as the drive mode for live view display. The use of the thinned readout mode can provide an image signal with a lower amount.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image pickup apparatus comprising:
   an imager having a plurality of drive modes including at least a drive mode for a low-resolution image wherein a resolution of image data acquired by the imager is lowered by reducing the number of pixels of the acquired image data, and a drive mode for a high resolution image wherein the resolution of the image data acquired by the imager is not lowered;
   a face-area detection part that detects a face area where a face is present in image data acquired by image shooting in the drive mode for a low resolution image;
   a feature value detection area determining part that determines a feature value detection area in the image data acquired by the image shooting in the drive mode for a high-resolution image for detecting a feature value, corresponding to the detected face area, based on information of the detected face area; and
   a feature value detection part that detects the feature value for specifying an individual from image data within the determined feature value detection area,
   wherein the image shooting in the drive mode for a low-resolution image and the image shooting in the drive mode for high-resolution image are performed at a same angle of view for a same imaging subject.

2. The image pickup apparatus according to claim 1, wherein the drive mode for a low-resolution image includes a drive mode for displaying a live view image, and the drive mode for a high-resolution image includes a drive mode for a still image.

3. The image pickup apparatus according to 1, wherein the drive mode for a low-resolution image is a live view pixel mixing mode in which charges from a plurality of pixels in the imager are mixed before being output.

4. The image pickup apparatus according to claim 2, wherein the drive mode for a low-resolution image is a live view pixel mixing mode in which charges from a plurality of pixels in the imager are mixed before being output.

5. The image pickup apparatus according to claim 1, wherein the drive mode for a low-resolution image is a thinned readout mode in which charges from individual pixels in the imager are partly thinned before being output.

6. The image pickup apparatus according to claim 2, wherein the drive mode for a low-resolution image is a thinned readout mode in which charges from individual pixels in the imager are partly thinned before being output.

7. The image pickup apparatus according to claim 1, wherein the feature value detection area determining part has:

a face-area expansion part that expands the face area detected by the face-area detection part based on a predetermined condition; and
   a feature value detection area extracting part that extracts an area corresponding to the expanded face area from the image data acquired by image shooting in the drive mode for a high-resolution image, as the feature value detection area.

8. The image pickup apparatus according to claim 7, wherein the predetermined condition is a time difference between a shooting timing in the drive mode for a low-resolution image and a shooting timing at which image data used last in detection of the face area before initiating image shooting in the drive mode for a high-resolution image, and
   the face-area expansion part increases a degree of expansion of the face area when the time difference is large.

9. The image pickup apparatus according to claim 7, further comprising a luminance measuring part that measures a luminance of a subject, wherein
   the predetermined condition is the luminance of the subject measured by the luminance measuring part, and
   the face-area expansion part increases a degree of expansion of the face area when the luminance of the subject is low.

10. An individual specifying system comprising:
    (a) an image pickup apparatus including
    1) an imager having a plurality of drive modes including at least a drive mode for a low resolution image wherein a resolution of image data acquired by the imager is lowered by reducing the number of pixels of the acquired image data, and a drive mode for a high resolution image wherein the resolution of the image data acquired by the imager is not lowered,
    2) a face-area detection part that detects a face area where a face is present in image data acquired by image shooting in the drive mode for a low resolution image,
    3) a feature value detection area determining part that determines a feature value detection area in the image data acquired by the image shooting in the drive mode for a high-resolution image for detecting a feature value, corresponding to the detected face area, based on information of the detected face area, and
    4) a feature value detection part that detects the feature value for specifying an individual from image data within the determined feature value detection area,
    wherein the image shooting in the drive mode for a low-resolution image and the image shooting in the drive mode for a high-resolution image are performed at a same angle of view for a same imaging subject; and
    (b) an individual specifying part including:
    1) a feature value database that stores feature value data for specifying an individual, and
    2) a feature value collation part that collates the feature value detected by the feature value detection part with the feature value data stored in the feature value database.

11. A method of specifying an individual from a feature value of a face of a subject, the method comprising:
    shooting a live view image of a subject in a drive mode for a low-resolution image and a still image thereof in a drive mode for a high-resolution image, by means of an imager having a plurality of drive modes including at least the drive mode for a low resolution image wherein a resolution of image data acquired by the imager is lowered by reducing the number of pixels of the acquired image data and the drive mode for a high-resolution image wherein the resolution of the image data acquired by the imager is not lowered;

detecting a face area of the subject in a frame of the shot live view image;

detecting a feature value of the face of the subject in that area in the shot still image which includes at least an area corresponding to the face area of the subject detected in the frame of the live view image; and specifying the individual subject from the feature value of the face of the subject, wherein the shooting in the drive mode for a low resolution image and the shooting in the drive mode for a high-resolution image are performed at a same angle of view for a same imaging subject.

12. The image pickup apparatus according to claim 1, wherein the face-area detection part detects the face area by detecting an area including circular skin color area in the image data, acquired in the drive mode for a low-resolution image, using pattern matching.

13. The individual specifying system according to claim 10, wherein the face-area detection part detects the face area by detecting an area including circular skin color area in the image data, acquired in the drive mode for a low-resolution image, using pattern matching.

14. The method according to claim 11, wherein the act of detecting the face-area of the subject includes detecting an area including circular skin color area in the image data, acquired in the drive mode for a low-resolution image, using pattern matching.

* * * * *